United States Patent [19]

Arney

[11] Patent Number: 4,744,446
[45] Date of Patent: May 17, 1988

[54] APPARATUS FOR TEMPORARILY ATTACHING ONE ITEM OF LUGGAGE TO ANOTHER

[75] Inventor: Michel D. Arney, Lowell, Mass.
[73] Assignee: Wang Laboratories, Inc., Lowell, Mass.
[21] Appl. No.: 112,204
[22] Filed: Oct. 22, 1987

Related U.S. Application Data

[63] Continuation of Ser. No. 831,694, Feb. 21, 1986.
[51] Int. Cl.$^4$ ............... A45C 5/06; A45C 13/00; A45C 15/00
[52] U.S. Cl. ............... 190/108; 190/102; 190/110; 150/111; 150/113; 383/37
[58] Field of Search ............... 190/100, 102, 108, 109, 190/110; 150/111-113; 383/37, 61; 220/23.4, 23.83

[56] References Cited

U.S. PATENT DOCUMENTS

| | | | |
|---|---|---|---|
| 922,567 | 5/1909 | Cosgrove | 190/102 X |
| 1,084,360 | 1/1914 | Rahm | 190/108 |
| 1,567,461 | 12/1925 | Patterson | 190/102 |
| 2,372,845 | 4/1945 | Nelson | 190/108 |
| 2,428,906 | 10/1947 | Cannella | 190/108 X |
| 2,801,666 | 8/1957 | Steele | 150/113 |
| 2,858,957 | 11/1958 | Darrah | 190/108 X |
| 3,837,447 | 9/1974 | Honan | 190/108 X |
| 4,098,312 | 7/1978 | McCain | 150/113 X |
| 4,122,925 | 10/1978 | Schultheiss | 190/108 |
| 4,142,563 | 3/1979 | Ackerfeldt et al. | 383/37 X |
| 4,257,463 | 3/1981 | Monaco | 150/111 |
| 4,286,639 | 9/1981 | Murphy | 383/61 X |
| 4,673,070 | 6/1987 | Ambal | 190/102 X |

FOREIGN PATENT DOCUMENTS

| | | | |
|---|---|---|---|
| 3211413 | 12/1983 | Fed. Rep. of Germany | 190/108 |
| 631038 | 9/1927 | France | 190/109 |
| 1562995 | 4/1969 | France | 190/108 |

Primary Examiner—William Price
Assistant Examiner—Sue A. Weaver
Attorney, Agent, or Firm—Michael H. Shanahan; Gordon E. Nelson

[57] ABSTRACT

Apparatus for temporarily attaching one object to another object which includes a channel on one object, a form on the other object which may be slidably inserted into the channel, a flap on one object, and means for engaging the flap on the other object. The objects are connected to each other by sliding the form into the channel and then engaging the flap with the engagement means when engaged, the flap prevents sliding motion, and thereby ensures that the form does not slid out of the channel.

10 Claims, 1 Drawing Sheet

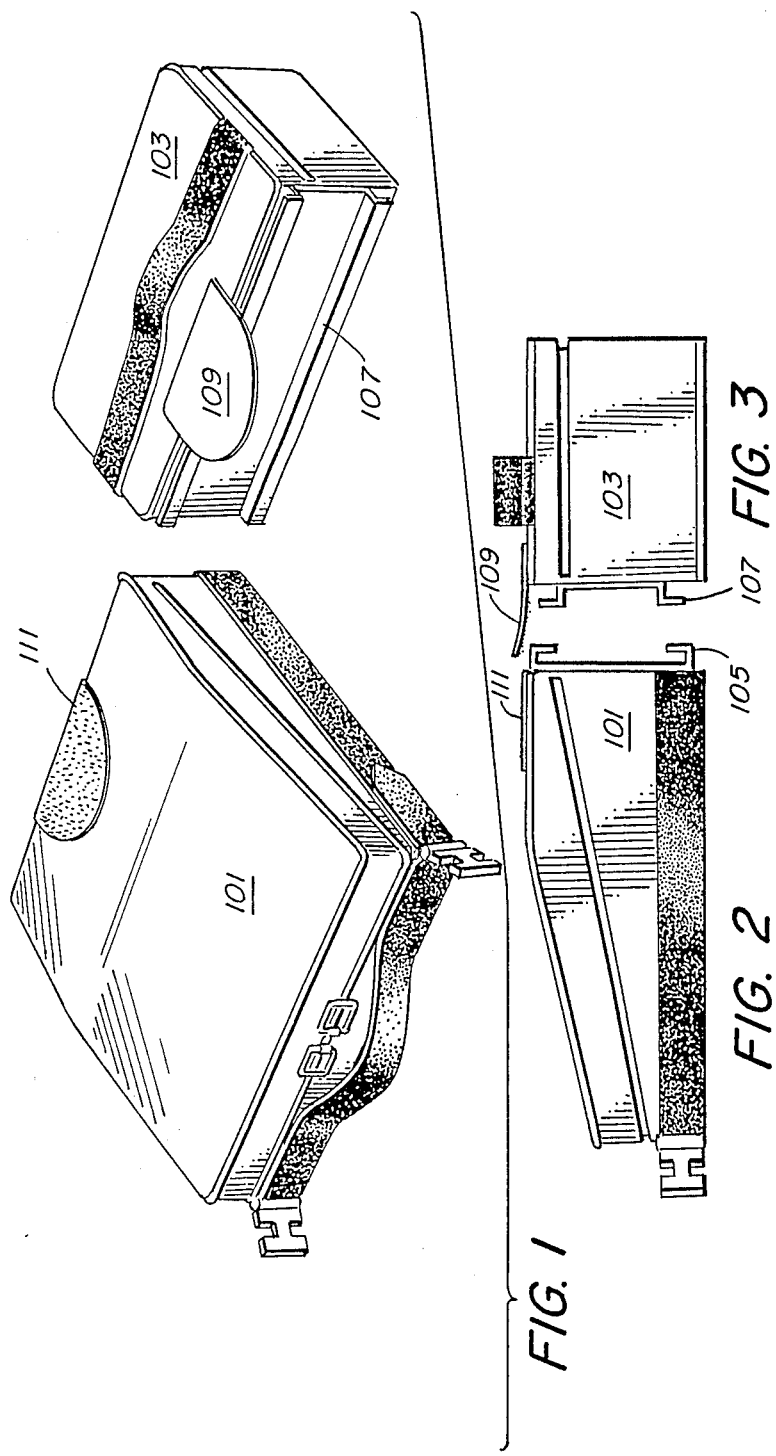

APPARATUS FOR TEMPORARILY ATTACHING ONE ITEM OF LUGGAGE TO ANOTHER

This is a continuation of co-pending application Ser. No. 831,694 filed on 2/21/86.

BACKGROUND OF THE INVENTION

1. Area of the Invention

The present invention relates to apparatus used to temporarily attach one object to another, for example, one piece of luggage to another. More specifically, the present invention relates to attachment apparatus wherein the attachment is made by sliding one portion of the apparatus into another portion of the apparatus.

2. Description of the Prior Art

One technique which the prior art has used to temporarily attach a first object to a second object is to provide a channel for one of the objects and a form which may be slid into the channel for the second object and to then attach the first object to the second object by sliding the form into the channel. A primary consideration in applying this technique is how lateral motion of the objects relative to each other may be prevented once the two objects have been joined. Typical solutions to the problem have been blocking the channel by means of screws or pins, inserting pins through both the channel and the form, or using friction means such as a set screw to hold the form in the channel.

While these and related solutions have served to prevent lateral motion of the attached objects, the solutions are themselves not without problems. First, any solution which uses small parts such as screws or pins will have to deal with the tendency of such parts to get lost or fall out at unexpected times. Second, solutions using friction means do not positively prevent slippage and the objects may come apart if they are handled particularly roughly. Moreover, as the friction means age, they will tend to provide less resistance to slippage. Third, any solution such as a pin passing through both the channel and the form which requires precise alignment of the first object with the second object will greatly increase the difficulty of attaching the objects to each other.

As will be explained in more detail below, the present invention is intended to solve the above-described problems of the prior art. It does so by providing attachment apparatus wherein the attachment is achieved slidably, but means are provided which positively prevent lateral motion of the objects relative to each other without the use of small parts and without the need for precise location of one of the objects relative to the other.

SUMMARY OF THE INVENTION

The present invention is used to prevent lateral motion relative to each other of two objects which are slidably attached to each other. One of the objects has a flap attached to it, and the other has some means for engaging the flap attached to it. The two objects are slidably attached and then moved laterally relative to each other until the flap engaging means can engage the flap. Once the flap is engaged, it prevents further lateral motion. It is advantageous to place the flap and the flap engaging means in locations such that the engagement between the flap and the flap engaging means takes place in a direction perpendicular to that of the lateral motion used to join the objects. It is further advantageous to use flap engaging means which do not require precise orientation of the flap relative to the flap engaging means in order to engage the flap. In one particularly advantageous form of the invention, the flap engaging mean is made of materials which adhere to each other when pressed together.

In other aspects of the invention, the objects may be slidably attached by means of a channel and channel engaging means which may be inserted in the channel and either the channel or the channel engaging means may serve as a foot for the object to which it belongs when the objects are not attached to each other.

It is thus an object of the invention to provide improved means of attaching one object to another object;

It is another object of the invention to provide means for preventing lateral motion between objects which are slidably attached to each other;

It is an additional object of the invention to prevent slidably attached objects from sliding relative to each other by providing a flap attached to one of the objects and flap engaging means attached to the other of the objects;

It is a further object of the invention to provide flap engaging means which do not require precise orientation of the flap relative to the flap engaging means;

It is still another object of the invention to provide a flap and flap engaging means in which the flap engages the flap engaging means in a direction substantially perpendicular to the direction in which the objects slide relative to each other;

It is a yet further object of the invention to provide apparatus for slidably attaching one object to another in which the attachment means may additionally serve as a foot for the object.

Additional advantages and objects of the invention will become clear to those skilled in the art upon reading the following Description of a Preferred Embodiment and studying the drawing, wherein

BRIEF DESCRIPTION OF THE DRAWING

FIG. 1 is a perspective drawing of a portable computer case and detachable accessory bag employing a preferred embodiment of the invention;

FIG. 2 is an end view of the portable computer case; and

FIG. 3 is an end view of the accessory bag.

DESCRIPTION OF A PREFERRED EMBODIMENT

A preferred embodiment of the invention is presently employed in a carrying case for a portable computer and an accessory bag which may be attached to the carrying case. FIG. 1 shows perspective and end views of this preferred embodiment.

Carrying case 101, shown in persprective in FIG. 1, is a carrying case of a type well known for portable equipment such as typewriters and computers. As may be seen from the end view of case 101 in FIG. 2, the back side of case 101 has attached to it channel 105, which is open at at least one end. Channel 105's cross section is that of a squared-off C. Accessory bag 103 shown in perspective in FIG. 1 is simply a bag for accessories belonging to the portable computer which will be carried in case 101. One side of bag 103 has attached to it form 107. As may be seen from the end view of bag 103 in FIG. 3, form 107's cross section is such that form 107 may be inserted into the open end of channel 105 and slid laterally the full length of channel 105. Channel 105 retains form 107, and thus attaches bag 103 to case 101.

In the illustrated embodiment channel 105 and form 107 are made of an extrudable impact-resistant plastic such as nylon.

After form 107 has been inserted into channel 105, lateral motion of bag 103 and case 101 relative to each other is prevented by flap 109 and flap attachment area 111. In this embodiment, flap 109 is a cloth flap which is sewn to bag 103 and which has the fabric for the hook side of the well known fastening system sold under the trademark Velcro attached to its underside. Flap attachment area 111 is sewn to case 101 and consists of the fabric for the loop side of the fastening system. When form 107 has been inserted in channel 105 and case 101 and bag 103 are in the proper positions relative to each other, flap 109 is pressed down onto flap attachment area 111. The hooks on flap 109 engage the loops on flap attachment area 111, preventing further lateral motion of case 101 and bag 103 relative to each other.

Bag 103 is detached from case 101 by a process which is the reverse of the attachment process. Flap 109 is pulled upward from attachment area 111 with sufficient force to cause the hooks to disengage from the loops. With flap 109 disengaged, bag 103 may be slid laterally until form 107 is disengaged from channel 105, detaching bag 103 from case 101.

The illustrated embodiment is particularly advantageous in a number of respects. First, the use of the hook and loop fastening system on flap 109 and flap attachment area 111 makes precise lateral alignment of case 101 with bag 103 unnecessary, since flap 109 will engage flap attachment area 111 if any part of flap 109 overlaps with flap attachment area 111. Second, flap 109 engages flap attachment area 111 in a direction which is perpendicular to the line along which lateral motion between case 101 and bag 103 is possible when the two are attached, thereby utilizing the maximum holding strength of the hook and loop fastening system to prevent lateral motion between case 101 and bag 103. Third, in addition to permitting bag 103 to be attached to case 101, channel 105 serves as a foot upon which case 101 may stand if it is set upon its end.

While the embodiment shown in FIG. 1 is a presently-preferred embodiment for the invention as used to attach an accessories bag to a carrying case, many other variations of the invention are possible and the invention may be used to attach many different kinds of objects to each other. Among the variations are the following:

Channel 105 and form 107 may have a variety of cross sections and may be made of a variety of materials;

Form 107 may be replaced by knobs which slide into and engage channel 105;

Channel 105 and form 107 may be replaced with one or more keyhole type attachment arrangements, in which a knob on the end of a shaft is inserted into a large hole and the shaft then moved laterally into a slot which is smaller than the knob;

Either of means used to attach case 101 to bag 103 may be on either of case 101 and bag 103 respectively and flap 109 and attachment area 111 may be on either of case 101 and bag 103 respectively;

Flap 109 may be attached to attachment area 111 by means other than the hook and loop fastening system, including a snap, a button, a turnbuckle, insertion into a slot, and so forth. As explained above, those attachment techniques are particularly advantageous which do not require precise alignment of flap 109 with attachment area 111;

Flap 109 may be made of any flexible material or may be inflexible and may be connected by means of a hinge to bag 103;

There may be more than one attachment area 111; in such an embodiment, it would be possible to attach a number of small objects to a larger object or to attach a single object at a number of different positions.

The preferred embodiment disclosed herein is thus to be regarded as purely exemplary, and the scope of the invention is to be determined solely by the appended claims as interpreted to the breadth permitted by the doctrine of equivalents.

What is claimed is:

1. Apparatus for temporarily attaching one item of luggage to another item of luggage comprising:
   weight-bearing attachment means for attaching the one item to the other item and bearing substantially all of the weight of either item including
   a channel with a substantially C-shaped profile attached to the one item;
   a form attached to the other item and having a shape permitting slidable insertion into the interior of the C-shaped profile; and
   means for preventing sliding of the form in the channel including a flap having a first end and second end, the first end being attached to a first surface of either the one or the other item and the first surface lying substantially in a first plane which, when the one item is attached to the other item, is parallel to the direction of insertion; and
   flap engaging means attached to a second surface of the item to which the flap is not attached for releasably engaging the second end when the form is inserted in the channel and thereby preventing sliding, the second surface lying substantially in a second plane which, when the one item is attached to the other item, is parallel to the direction of insertion.

2. The apparatus as set forth in claim 1 and wherein:
   the flap engaging means does not require precise orientation of the second end relative to the flap engaging means to engage the second end.

3. The apparatus as set forth in claim 2 and wherein:
   the flap engaging means and the second end cooperate to prevent rotation of the second end.

4. The apparatus as set forth in claim 1 and wherein:
   the second end includes a first surface of a hook and loop fastening system; and
   the flap engaging means includes a second surface of a hook and loop fastening system for engaging the first surface of the hook and loop fastening system.

5. The apparatus as set forth in claim 1 and wherein:
   the flap is made of flexible material;
   the first end is attached to the first surface by sewing; and
   the flap engaging means is attached to the second surface by sewing.

6. The apparatus as set forth in claim 5 and wherein:
   the second end includes a first surface of a hook and loop fastening system; and
   the flap engaging means includes a second surface of a hook and loop fastening system for engaging the first surface of the hook and loop fastening system.

7. The apparatus as set forth in claim 1 and wherein:
   the first and second surfaces have adjacent edges when the one item is attached to the other item;

the flap is made of flexible material;

the first end of the flap is attached to the first surface close to the adjacent edge of the first surface; and the flap engaging means is attached to the second surface close to the adjacent edge of the second surface.

8. The apparatus as set forth in claim 7 and wherein:

the first end is attached to the first surface by sewing; and the flap engaging means is attached to the second surface by sewing.

9. The apparatus as set forth in claim 8 and wherein:

the second end includes a first surface of a hook and loop fastening system; and the flap engaging means includes a second surface of a hook and loop fastening system for engaging the first surface of the hook and loop fastening system.

10. Apparatus for temporarily attaching one item of luggage to another item of luggage comprising:

weight-bearing attachment means for attaching the one item to the other item and bearing substantially all of the weight of either item including a channel with a substantially C-shaped profile attached to a first surface of the one item;

a form attached to a second surface of the other item and having a shape permitting slidable insertion into the interior of the C-shaped profile; and means for preventing sliding of the form in the channel including a flap made of flexible material and having a first end attached to a third surface and a second end bearing a first surface of a hook and loop attachment system and flap engaging means attached to a fourth surface and bearing a second surface of a hook and loop attachment system for engaging the first end, the third and fourth surfaces lying substantially in planes parallel to the direction of insertion and having edges adjacent to each other when the items are attached and the first end being attached to the third surface and the flap engaging means being attached to the fourth surface close to the adjacent edges.

* * * * *